June 12, 1923.  1,458,178
R. H. GRIFFITH
PLANTER
Filed Jan. 31, 1921   4 Sheets-Sheet 3
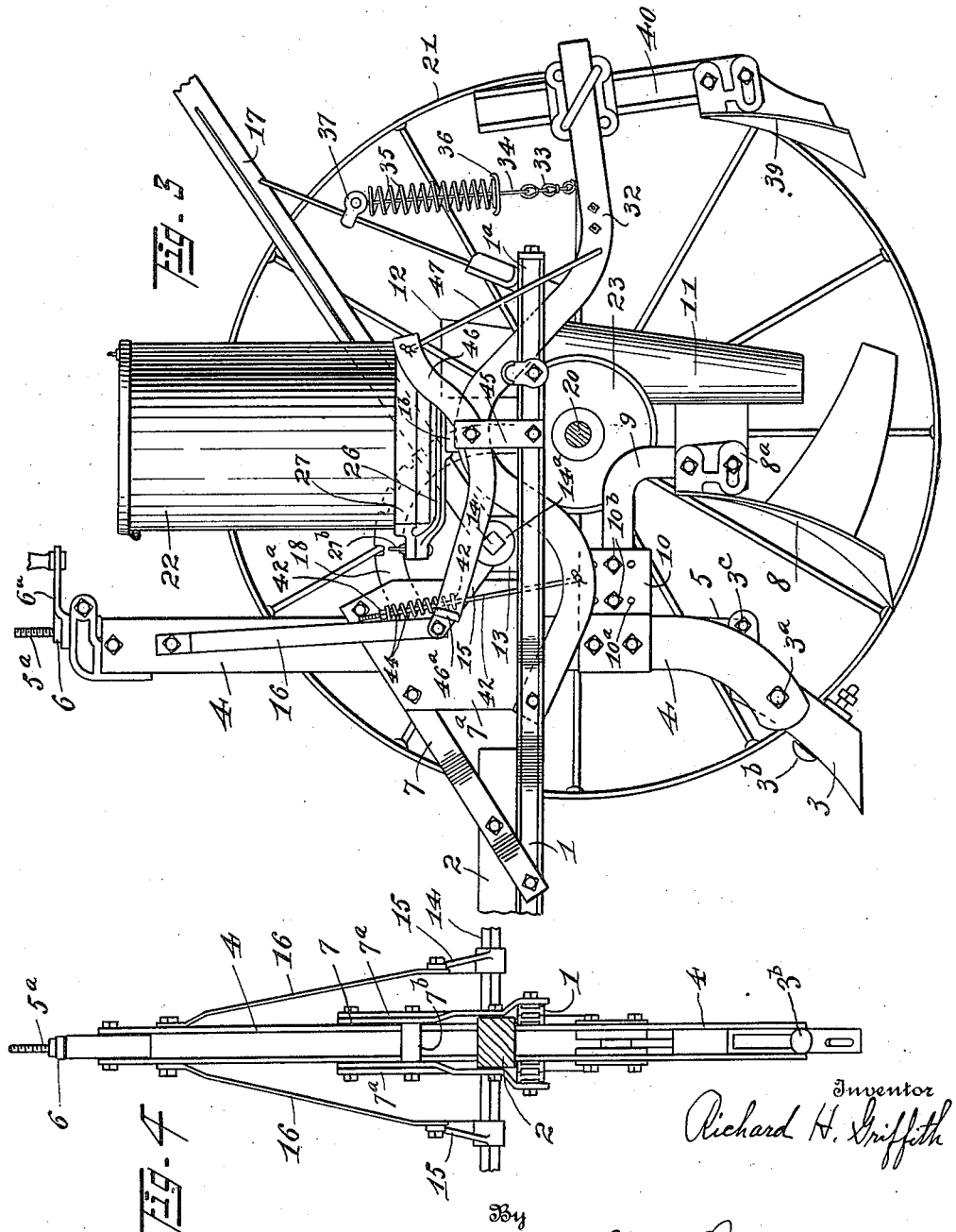
Inventor
Richard H. Griffith

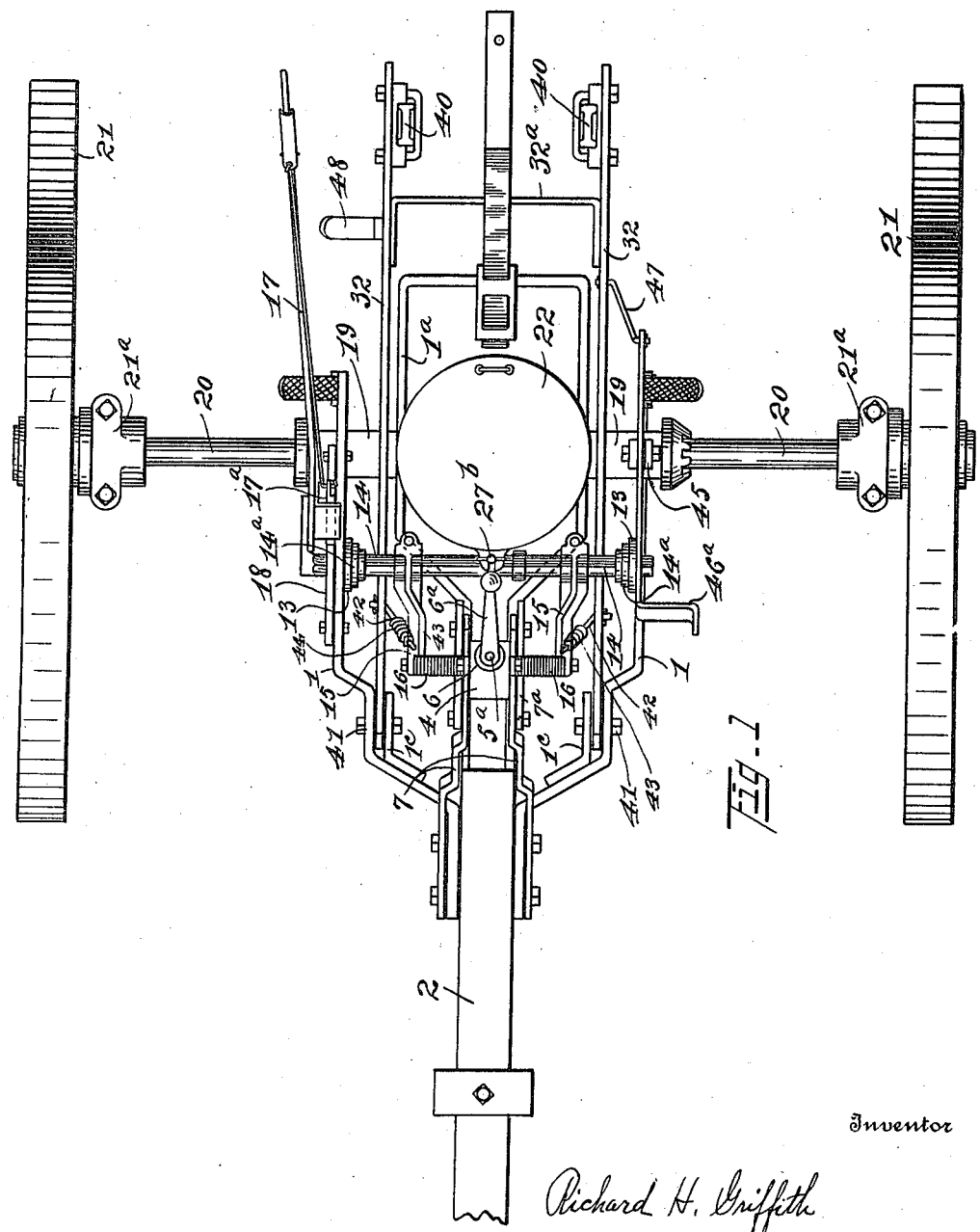

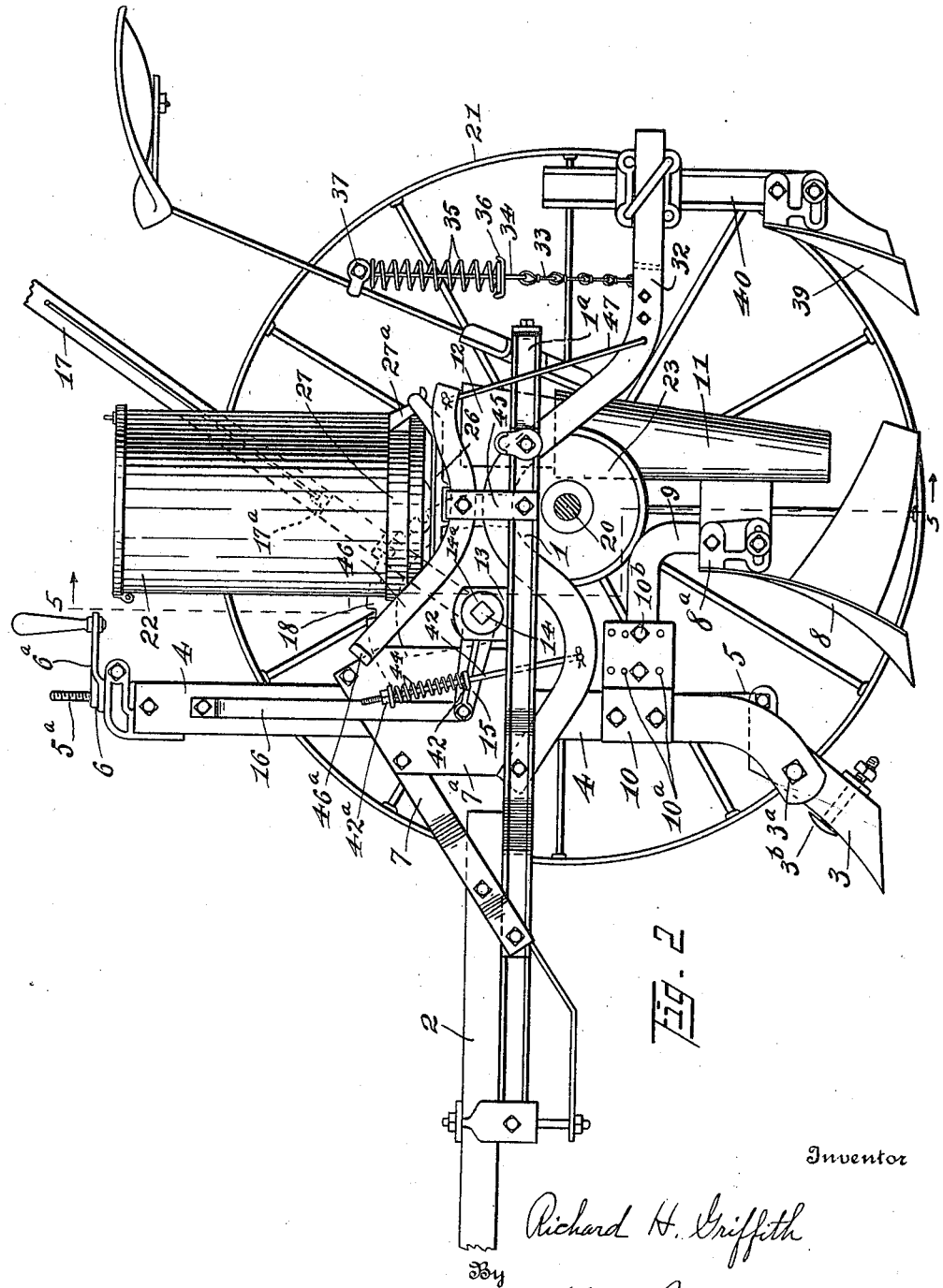

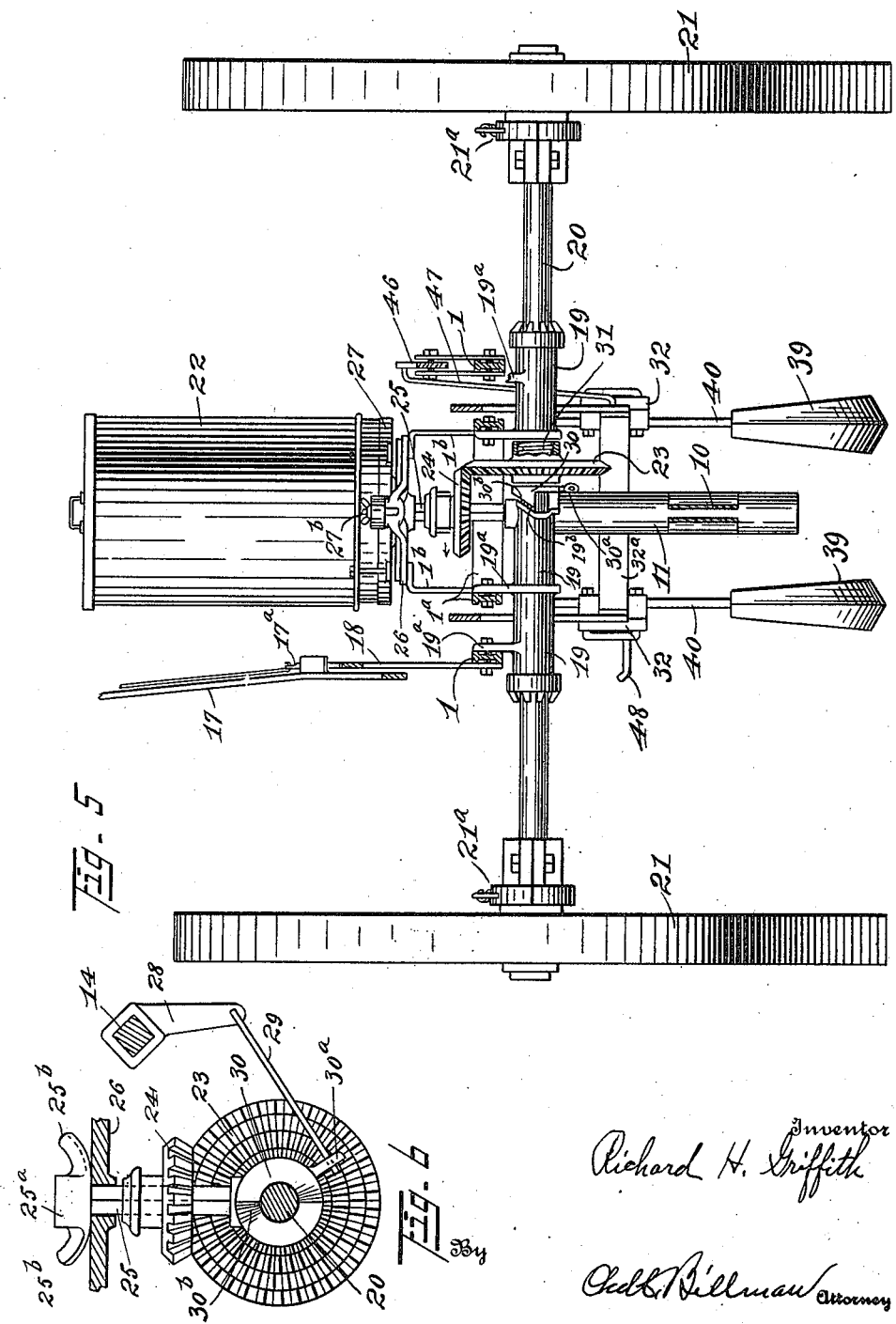

Patented June 12, 1923.

1,458,178

UNITED STATES PATENT OFFICE.

RICHARD H. GRIFFITH, OF BELLEVUE, OHIO, ASSIGNOR TO THE OHIO CULTIVATOR COMPANY, OF BELLEVUE, OHIO, A CORPORATION OF OHIO.

PLANTER.

Application filed January 31, 1921. Serial No. 441,260.

*To all whom it may concern:*

Be it known that I, RICHARD H. GRIFFITH, a citizen of the United States, residing at Bellevue, in the county of Huron and State of Ohio, have invented certain new and useful Improvements in Planters, of which the following is a specification.

My invention relates to improvements in planters, and more particularly to that class or type known as "lister planters" commonly used for planting cotton, corn and the like.

The primary object of the invention is the provision of a generally improved planter of the type indicated, which will be simple in construction and efficient in operation.

A further object is to improve the construction and arrangement of the parts whereby the manipulation of a single operating lever will positively move the furrow opener and covering shovels out of engagement with the ground and at the same time positively disconnect the feeding device from its driving mechanism.

A further and very important object of the invention is the provision of a supplementary or auxiliary frame carrying the covering devices or shovels so connected and arranged with respect to the furrow opener operating or actuating mechanism that said supplemental frame and shovels may be either actuated simultaneously with the furrow opener actuating mechanism or independently thereof thru suitable foot levers whereby at the end of the furrow such furrow covering shovels may be held down after the elevation and disengagement of the furrow opener and feeding mechanism, respectively, thereby covering the seed last deposited in the furrow.

A still further object is to improve the general construction, arrangement and relative mounting of the parts whereby the same may be readily adjusted and moved to meet the varying exigencies of actual service.

With the above mentioned and other ends in view, the invention consists in the novel construction, arrangement and combination of parts, hereinafter described, illustrated in one of its embodiments in the accompanying drawings and particularly pointed out in the appended claims.

Referring to the drawings, forming a part of this specification, Figure 1 is a top plan view of a planter constructed in accordance with this invention, the furrow opener shovel or plow being removed for the purpose of clearer illustration of the adjusting mechanism for moving and supporting the shovel at different angles to the ground line.

Fig. 2, a side elevation of the same, one of the ground wheels being removed, and the furrow opener and covering shovels being in their down or operative positions, the feed mechanism being in gear.

Fig. 3, a similar view with the furrow opener and covering shovels elevated, the feed mechanism being thrown out of gear with the axle driving shaft.

Fig. 4, a detached front elevation of the vertically movable furrow opener shank and the adjusting and operating mechanism therefor.

Fig. 5, a cross sectional view, partly in front elevation, taken on line 5—5 of Fig. 2.

Fig. 6, a detached detailed view of the variable feed mechanism and gear shift and the connections between the latter and the lever operated shafts for actuating the furrow opener.

Similar numerals of reference designate like parts thruout all the figures of the drawings.

The improved planter comprises a main frame 1, made up of side members forwardly converging and connected to a draft pole or tongue 2. Supported by this frame at its forward end is a furrow opener, which, in the present instance, is omitted (being of well known and understood construction) and preferably comprising a shovel mounted on a shovel carrying shoe 3, for the purposes herein mentioned.

As a means of providing for the adjustment of the furrow opener either simultaneously with or independently of the movements of the other parts carried by the main frame, the shovel carrying shoe 3, is pivotally mounted at the lower end of a vertically movable shank 4, said shank, in the present instance, being made up of two spaced parallel extending side bars, the shoe 3 being pivotally mounted between the lower ends of the same by means of a transverse pivot bolt 3ª. The shovel may be secured on the shoe 3, by means of a connecting bolt 3ᵇ, and as a means of rocking the shoe 3 in the shank 4, whereby the furrow opener or shovel carried thereby may be rocked or adjusted, the rear end of the shoe is provided with a pair of lugs connected by means of a pivot bolt 3ᶜ, the latter being connected to a relatively movable rod 5, extending upwardly between the members of the shank 4, and terminating at its upper end in a threaded portion 5ᵃ. The upper end of the shank 4, is provided with a threaded head 6, rotatably mounted thereon and receiving the threaded end 5ᵃ, of the rod 5. The head 6, is provided with a handle 6ᵃ, so that by turning the handle 6ᵃ, movement will be imparted to the rod 5, and thereby cause the shoe 3, to move on its pivot 3ᵃ, thereby adjusting the shovel to any desired angle to the ground line or surface being traversed by the furrow opener.

The shank 4, is mounted in a guide head formed on the main frame 1, said guide head, in the present instance, comprising brace members 7, and side plates 7ᵃ, the guide or brace members 7, being preferably provided with guide rollers 7ᵇ, as shown most clearly in Fig. 4 of the drawings.

The main furrow opener is followed by a second or supplementary furrow opener arranged in the rear therof and in alignment therwith, said second shovel or plow opening a sub-furrow in which the seed is actually deposited. The second or sub-furrow opener is preferably in the form of a shovel 8, narrower in width than the front or main furrow opener, said shovel 8 being mounted on a support 8ᵃ, carried by an arm 9, the latter extending forwardly and being rigidly secured to the shank 4, thru the medium of a bracket 10, suitable openings 10ᵃ, being formed in the bracket 10, to receive the fastening elements or bolts 10ᵇ, by means of which the arm 9, and support 8ᵃ, and shovel 8, may be vertically adjusted relative to the main furrow opener and the shank 4.

Rigidly secured to the support 8ᵃ, is a guide tube or shield 11, which is adapted to surround the lower end of the grain spout 12.

As a means of actuating and adjusting the main and auxiliary furrow openers, the side members of the main frame 1, are provided with bearing blocks 13, provided, in the present instance, with an angular shaped rock shaft 14, provided with forwardly extending arms 15, arranged on each side of the shank 4, and connected thereto by means of links 16.

The angular rock shaft 14, is provided, in the present instance, with bushings 14ᵃ, mounted in the bearing blocks or brackets 13, and as a convenient means of rocking the shaft 14, the latter is preferably provided at one end with a hand lever 17, the latter being preferably provided with a spring pressed dog or detent 17ᵃ, adapted to co-operate with a toothed segment 18, on the main frame to retain the lever and its connections in adjusted position.

The main frame of the planter further includes a second or inner supplementary stationary frame 1ᵃ, having its side members forwardly converging and connected to the guide head and tongue portions of the implement. The main and supplementary stationary frames 1 and 1ᵃ, respectively, are suitably connected to brackets 19ᵃ, of suitable bearing heads or sleeves 19, adapted to receive and contain an axle driving shaft 20, the latter being provided at its ends with suitable ground wheels 21. The ground wheels 21, may be connected to the axle shaft 20, in any suitable and convenient manner, as for example,—thru the medium of clutches 21ᵃ, and as a means of driving the feeding mechanism of any suitable and convenient form located in the base or bottom portion of the feed hopper 22, the axle shaft 20, is provided with a driving gear 23, adapted to mesh with a second gear 24, the latter being mounted on an angular shaped driving shaft 25, extending upwardly and mounted in the saddle 26, or stationary hopper supporting member, the shaft 25 being provided at its top with a suitable driving head 25ᵃ, having suitable projections 25ᵇ, to engage with a feed disc of any suitable and convenient type. The base 27, of the hopper, is adapted to be detachably secured to the stationary hopper suporting saddle 26, by means of hinged lugs 27ᵃ, and the connecting element or bolt 27ᵇ, at the front. The base of the hopper and the feed plates or discs are arranged so that the same may be removed with the detachment of the hopper, and forming no part of the present invention need not be described in detail.

It will be noted that the hopper supporting saddle 26, is mounted on side bracket members 1ᵇ, (see Fig. 5), connected to the side members of the inner stationary frame 1ᵃ.

As a means of throwing the gear 23, into and out of engagement with the gear 24, simultaneously with the downward and upward movements of the furrow openers thru the furrow actuating and adjusting mechanism hereinbefore referred to, the lever actuated rock shaft 14, is provided with an arm 28, (see Fig. 6), connected to a connecting link 29, the latter being connected to a lever or arm 30ᵃ, the arm 30ᵃ being formed as a part of a rotary or oscillatory sleeve 30, the latter being provided at one side with the lateral cam face 30ᵇ, adapted to engage with a similarly shaped inclined or cam face 19ᵇ, on one of the supporting heads or sleeves 19, of the stationary frame. The gear 23, is adapted to be moved longitudinally of the driving shaft against the resistance of a spring 31, surrounding the axle shaft 20 (see Fig. 5), it being obvious that when the rock shaft is operated thru the medium of the lever 17, and the furrow openers are thereby elevated, the movement of the crank arm 28, will oscillate the sleeve 30, and the action of the cam face 30<sup>b</sup>, against the adjacent cam face 19<sup>b</sup>, will cause such sleeve to press the gear 23, against the resistance of the spring 31, and thereby disconnect such gear from the second gear 24, above, which actuates the feeding mechanism.

Referring now to the improved furrow covering shovels and the means for mounting and connecting the same to the furrow opener actuating mechanism whereby such furrow covering shovels may be either actuated simultaneously with such mechanism, or, when desired, may be actuated independently thereof thru suitable foot operated levers or devices, it will be seen that I provide an auxiliary or supplemental frame consisting, in the present instance, of side members or drag bars 32, connected at their rear by means of a cross bar 32<sup>a</sup>, the weight of the drag bars 32, and the shovels carried thereby, and the downward movements of the same being adjustably counterbalanced or suspended, as desired, by means of a suspension chain 33, connected to a loop 34, arrranged within a compression spring 35, the latter being suspended by means of a support 36, at the lower end, and connected to a suspending device extending thru the spring 35, and connected to a support 37, secured, in the present instance, to the seat standard or spring 38.

The furrow covering shovels 39, are mounted on suitable standards or shanks 40, the latter being adjustably secured to the sides of the drag bars 32.

The side members 32, of the auxiliary frame, extend forwardly over the axle shaft 20, and are pivotally connected at their front ends to the forward portions of the main frame 1, and suitable bracket 1<sup>c</sup>, and by means of bearing bolts 41.

As a means of flexibly and resiliently connecting the auxiliary frame or drag bars 32, to the furrow opener actuating mechanism, the front ends of the bars 32, are provided with links 42, extending upwardly thru guide members or brackets 43, formed, in the present instance, on the arms 15, of the rock shaft 14. As a means of resiliently connecting the links 42, to the arms 15, of the rack shaft, and permitting an independent movement of the links 42, relative to the arms 15, the upper ends of the links 42, are surrounded by coiled compression springs 44, resting on the bearing brackets 43, the upper ends of the springs 44, being provided with guide washers, and the links being threaded and provided with adjusting nuts 42<sup>a</sup>.

As a means of manually actuating or elevating and depressing the drag bars of the auxiliary frame independently of the furrow opener actuating mechanism to which it is movably and resiliently connected as above described, one side of the main frame 1, is preferably provided with a bearing standard 45, carrying the pivotally mounted rocker or lever 46, the rear end of the lever being connected to one of the bars 32, by means of a link 47, and the forward end of the rocker being turned outwardly affording a foot pedal 46<sup>a</sup>, it being obvious that by depressing the pedal 46<sup>a</sup>, the auxiliary frame carrying the furrow covering shovels will be elevated independently of the furrow opener actuating mechanism.

As a means of depressing the auxiliary frame or drag bars 32, when the furrow openers have been elevated, or of holding such drag bars down to cover the seed deposited at the end of the furrow following the elevation of such furrow opening devices, one of the bars 32, may be provided with a foot pedal 48, as shown most clearly in Fig. 1 of the drawing.

Having thus described one of the embodiments of my invention, without having attempted to set forth all the forms in which it may be made, or all the modes of its use, what I claim and desire to secure by Letters Patent, is,—

1. In a planter, a main frame provided with a vertically movable furrow opener, an actuating shaft provided with operating arms connected to said furrow opener, drag bars carried by said frame, link members connected to said drag bars and flexibly and resiliently connected to said operating arms of said actuating shaft, and a foot operated rocker on said main frame connected to said drag bars whereby the latter may be manually moved or held independently of said furrow opener actuating mechanism.

2. In a planter, a main frame provided with a guide head and a vertically movable shank carrying a furrow opener, an actuating rock shaft on said frame provided with arms and links operatively connected to said shank, drag bars pivotally carried by said frame, link members flexibly and resiliently connected to said drag bars and said arms of said actuating rock shaft, and a rocker connected to said drag bars whereby the latter may be moved or held independently of said furrow opener actuating mechanism.

3. In a planter, the combination with a main frame provided with a relatively fixed feed hopper and feeding mechanism, a vertically movable furrow opener, and furrow opener actuating mechanism connected to and throwing said feed mechanism into and out of operation with the actuation of said furrow opener into and out of ground engaging position; of furrow covering shovels and drag bars, the latter being provided with spring connections movably and flexibly connected to said furrow opener actuating mechanism whereby said drag bars and shovels will be simultaneously actuated with the manual actuation of said furrow opener and whereby said drag bars and covering shovels may be held in operative position to cover the end of the furrow when said furrow opener and feeding mechanism are out of operation.

4. In a planter, a main frame, a furrow opener provided with a vertically movable shank, a rock shaft provided with crank arms extending at the sides of said shank, links extending upwardly between said arms and said shanks, a spring suspended supplemental frame carried by said main frame and provided with upwardly extending links slidably and resiliently connected to said arms of said rock shaft for simultaneous normal operation with the latter and said furrow opener, a feed hopper and feed mechanism carried by said main frame, and crank and link means between said rock shaft and feed mechanism for throwing the latter into and out of operation with the movement of said furrow opener and furrow covering shovels into and out of their ground engaging positions, respectively.

In testimony whereof I have affixed my signature.

RICHARD H. GRIFFITH.